UNITED STATES PATENT OFFICE.

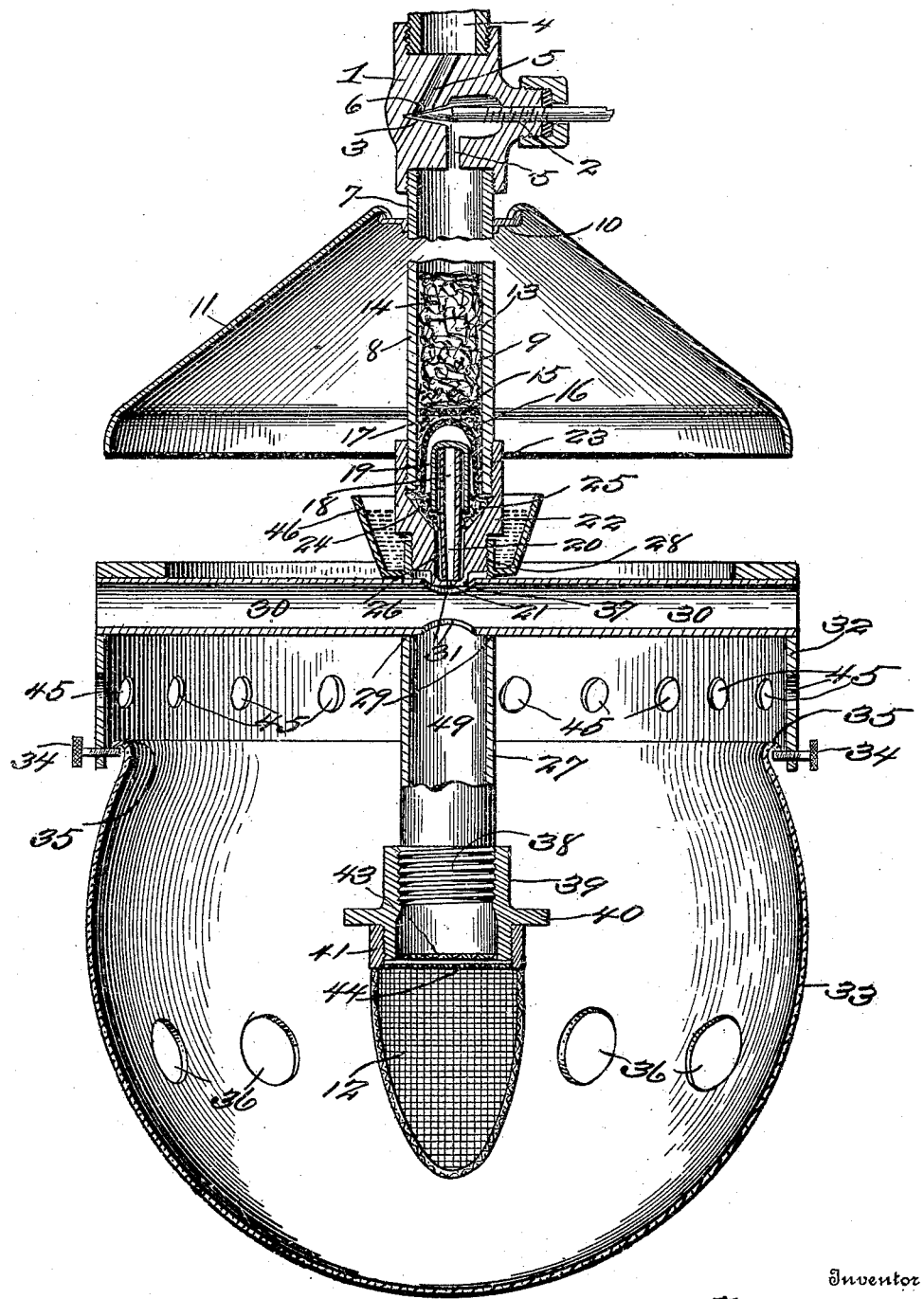

ALMON B. LEE, OF BIG RAPIDS, MICHIGAN.

GASOLENE-LAMP.

953,913.  Specification of Letters Patent.  Patented Apr. 5, 1910.

Application filed September 14, 1908. Serial No. 453,064.

*To all whom it may concern:*

Be it known that I, ALMON B. LEE, a citizen of the United States, residing at Big Rapids, in the county of Mecosta and State of Michigan, have invented a new and useful Gasolene-Lamp; and I do hereby declare the following to be a full, clear, and exact description of the invention, such as will enable others skilled in the art to which it appertains to make and use the same.

This invention pertains to a new and useful hydro-carbon incandescent lamp, and the main object of the invention is the production of an inverted gasolene lamp of this character, which may be utilized in any place, as desired, in lieu of an ordinary gas lamp.

This lamp is especially adapted for lighting halls, stores, residences, and any other place where a permanent lamp fixture is applicable; this lamp may be attached to any suitable conduit, or any other hollow piping.

Another object of the invention, is the provision of a lamp of this design, and so constructed, as to increase the lighting power of lamps of this character, and for the least possible cost.

The illumination obtained from a lamp of this design exists approximately fifty hours from one gallon of ordinary gasolene.

A lamp of this design generates its own gas, and automatically mixes it with the proper amount of oxygen or cool air, which is drawn into the mixing chamber or burner tube; the mixed gas and oxygen is then forced through the screens to the burner and mantle, where it may be ignited, in order to obtain the proper light.

A further object is to provide a generator tip, so constructed, as to prevent the gas orifice (which is very small) from becoming clogged, thereby eliminating the source of annoyance common in other makes of gasolene lamps.

A further object of the invention, resides in filtering the gasolene, before the same reaches the generator tip, and its orifice.

This invention comprises further objects, which will be hereinafter more fully described, shown in the drawings, and the novel features thereof will be pointed out by the appended claims.

In the drawing there is disclosed a sectional view through the improved hydrocarbon incandescent gasolene lamp, which illustrates the essential features of the invention.

Referring to the illustration 1 denotes a valve casing having the usual needle valve 2, which coöperates with the seat 3, in order to regulate the supply of gasolene to the lamp. This valve casing is connected to the gasolene supply pipe 4, which may receive the gasolene from any suitable source of supply (not shown). Extending through this valve casing 1 are bores 5, one located below the valve seat 3 and one above it, as clearly shown. The bore above the valve seat is disposed upon an incline, in order that the mouth 6 thereof may be closed by the valve 2.

Threaded into the lower portion of the valve casing 1 is a pipe or tubing 7, the portion 8 of which is used as the generator or retort 9, as will be clearly apparent. Surrounding the pipe 7 is an annular flanged ring 10, which supports the cap or shade 11, the purpose of which being to muffle or confine the heat rising from the flame at the mantle 12, about the generator or retort. The generating chamber 13 of the generator, has contained therein a loose packing of asbestos 14, which performs the function of a strainer or filter, through which the gasolene passes before reaching the parts below it. This asbestos packing 14 rests upon the meshwork or screen 15, below which the dome-shaped mesh work or screen 16 is disposed. This dome-shaped mesh-work or screen is carried by the lower peripheral end of the generator pipe 7, as clearly shown. Between the screen or meshwork 16 and the dome-shaped mesh work or screen is a loose asbestos packing 17, the function of which being similar to the packing 14. This dome-shaped mesh-work or screen acts as a covering, as well as surrounding the tube and the cap 18 and 19. The tube 18 is hollow and open ended, the lower half 20 of which being slightly tapered as shown, for obvious reasons. The tube 18 is telescopically received by the cap 19, as clearly shown, the closed end of which cap rests upon the upper portion of the said tube. The function of the cap is to absolutely prevent any sediment from entering the tube 18 and passing on through the gas orifice 21 of the generator tip 22. This generator tip is connected to the lower end of the generating pipe by means of suitable threads 23. Disposed in the hollow portions 24 of the tip, below the extremity of the generating pipe 7, and partially surrounding the cap 19 is a loose asbestos packing 25, the function of which being to filter the gasolene. The lower tapered half of the tube 18 is telescopically received by the bore 26 of the generator tip, as clearly shown. The pressure of the gas which emanates from the generating chamber is sufficient to force by the tube and cap 18 and 19, (which are loosely disposed in the tip,) in order to pass through the orifice 21.

The burner pipe or tube 27 is connected to the lower extremity of the tip 22 by suitable threads 28, as clearly shown. The burner pipe or tube has formed in its circumference openings or apertures 29, which are disposed directly opposite one another. Extending through these openings or apertures 29 is a transversely disposed pipe or tube 30, which is provided with openings or apertures 31, the axes of which are directly at right angles to those of the apertures or openings 29. The outer ends of the pipe or tube 30 are secured by any suitable means, preferably brazing, to the annular flanged ring 32, in order to support the same and the globe 33, which is supported by means of the thumb screws 34. These thumb screws 34 engage under the annular rolled flange 35 of the globe. This globe is provided with a series of openings 36, in order to allow air to pass therethrough, thereby forcing the heat up and under the shade 11. The generator tip is provided with a restricted portion 37 (through which the orifice 21 is formed), which restricted portion extends into one of the openings or apertures 31, in order to prevent displacement of the pipe or tube 30, as will be clearly understood.

The lower threaded portion 38 of the burner pipe or tube has connected thereto a sleeve 39. This sleeve 39 has an annular flange 40, which limits the movement of the annular ring 41, which carries the mantle 12. The sleeve 39 is provided with a screen or mesh-work 43, while the ring 41 is provided with a similar screen or mesh-work 44. These screens 43 and 44 are for the purpose of preventing particles of foreign matter (which may be drawn in with the cool air or oxygen) from entering the mantle, thereby obviating any possibility of hindering the illumination at the mantle. The annular flanged ring is provided with a plurality of apertures 45, the functions of which being similar to the apertures or openings 36 of the globe.

46 denotes an alcohol cup, which is carried by the upper portion of the burner pipe or tube 27, and which surrounds the generator tip 22. This alcohol cup may be lighted, in order to provide heat, by which the gas is generated, before igniting the lamp. The securing of this cup approximately at the base of the generator, is to insure a more complete generation of gas, thereby preventing the blazing up of the gasolene, when the lamp is first lighted. As the gas from the generator descends, the same draws the oxygen or air through the pipe or tube 30, and thoroughly mixes in the mixing chamber 49, after which the combined gases and oxygen descend to the mantle, where the same are ignited. The heat ascending from the mantle and the generator tip prevents the cooling off of the generator, should the lamp be suspended in a draft of air, thereby avoiding flickering or unsteadiness of the light.

From the foregoing, the essential features, elements and the operation of the device, together with the simplicity thereof, will be clearly apparent.

Having thus fully described the invention, what is claimed as new and useful is—

1. In a hydrocarbon incandescent lamp, a generator having a generator tip provided with a telescopically received member having a movable covering to prevent sediment from passing through the tip.

2. In an incandescent gasolene lamp, a generator having a generator tip provided with an orifice and provided with means for filtering the gasolene, said generator tip having a member telescopically received having a covering to prevent sediment from passing the said orifice.

3. In a hydrocarbon incandescent lamp, a generator having a generator tip provided with a telescopically received member having a movable covering to prevent sediment from passing through the tip, and means for filtering the gasolene.

4. In an incandescent gasolene lamp, a generator having a generator tip provided with an orifice and provided with means for filtering the gasolene, said tip having means telescopically received therein provided with covering means to prevent sediment from passing the orifice, and a dome-shaped meshwork disposed over said covering means.

5. In a hydrocarbon incandescent lamp, a generator having a generator tip provided with a telescopically received tubular member having its lower portion tapering, a movable covering for said member to prevent sediment from passing through the tip, and means for filtering the gasolene.

6. In an incandescent gasolene lamp, a generator having a generator tip provided with an orifice and provided with means for filtering the gasolene, said tip having means provided with a telescopically received cap to prevent sediment from passing through the orifice, a dome-shaped meshwork to cover said cap, and means through which oxygen is drawn as the gas emanates from the orifice.

7. In an incandescent gasolene lamp, a generator having a generator tip provided with an orifice and provided with means for filtering the gasolene, said tip having telescopic tapering means provided with a covering to prevent sediment from passing through the orifice, a dome-shaped meshwork arranged above said covering, means through which oxygen is drawn as the gas emanates from the orifice, and a mixing chamber for the gas and the oxygen.

8. In an incandescent gasolene lamp, a generator having a generator tip provided with an orifice, an open-ended tubular member telescopically received by said tip, a cap telescopically received by said member to prevent sediment from passing through the orifice, means through which oxygen may be drawn as the gas emanates from the orifice, the mixing chamber for the oxygen and gases, and a mantle carried by and below the mixing chamber.

9. In an incandescent gasolene lamp, a generator having a generator tip provided with an orifice and provided with means for filtering the gasolene, said tip having an open-ended tubular member having its lower portion tapering and telescopically received by said tip, a cap telescopically received by said member to prevent sediment from passing the orifice, a dome-shaped meshwork disposed over said cap, and means through which oxygen is drawn as the gas emanates from the orifice.

10. In an incandescent gasolene lamp, a generator having a generator tip provided with an orifice and provided with means for filtering the gasolene, said tip having an open-ended tubular member telescopically received by said tip, said member having its lower portion tapering, a cap fitted telescopically over said member to prevent sediment from passing the orifice, a loose packing arranged around said tubular member and said cap, a dome-shaped meshwork arranged above and over said cap, means through which oxygen is drawn as the gas emanates from the orifice, and a mixing chamber for the oxygen and gases.

In testimony whereof I have signed my name to this specification in the presence of two subscribing witnesses.

ALMON B. LEE.

Witnesses:
  BERT J. FORD,
  EARL R. LEE.